Dec. 26, 1933.  E. ROBERTS  1,940,812
MEANS FOR DISCHARGING MATERIAL FROM CENTRIFUGAL BASKETS
Filed Feb. 17, 1931  2 Sheets-Sheet 1

Inventor
Eugene Roberts
by Geo. N. Goddard,
Attorney

Dec. 26, 1933.  E. ROBERTS  1,940,812
MEANS FOR DISCHARGING MATERIAL FROM CENTRIFUGAL BASKETS
Filed Feb. 17, 1931  2 Sheets-Sheet 2
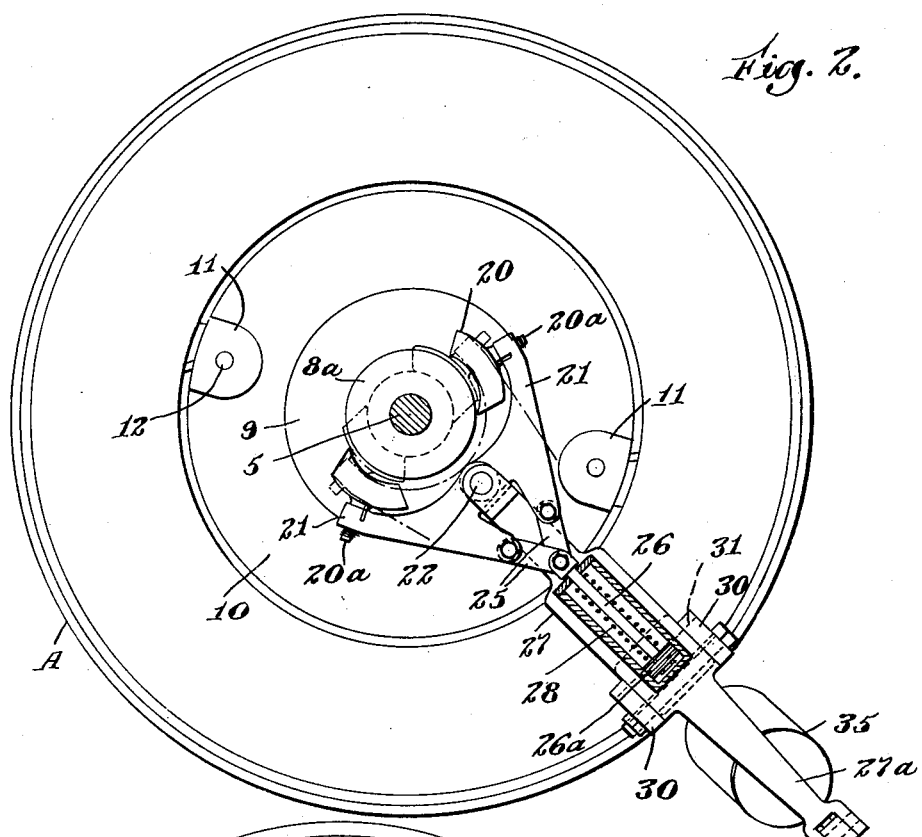
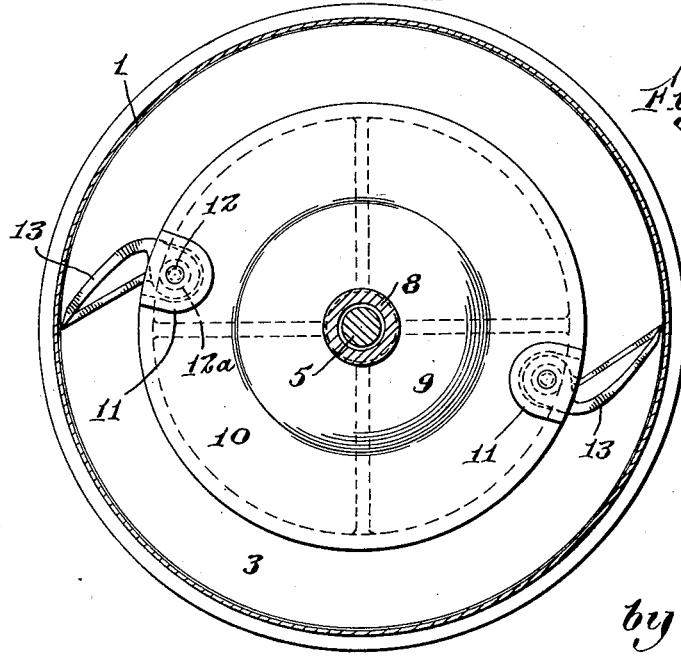
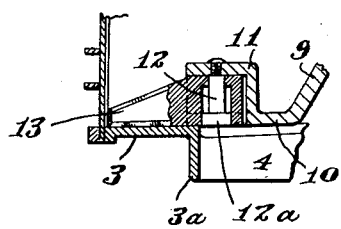
Inventor
Eugene Roberts
by Geo. N. Goddard
Attorney Patented Dec. 26, 1933

1,940,812

UNITED STATES PATENT OFFICE 1,940,812

MEANS FOR DISCHARGING MATERIAL FROM CENTRIFUGAL BASKETS

Eugene Roberts, Hastings, N. Y., assignor to The Western States Machine Company, Salt Lake City, Utah, a corporation of Utah Application February 17, 1931. Serial No. 516,372

13 Claims. (Cl. 210—74)

This invention relates to centrifugals of the well known sugar centrifugal type which embraces a perforated basket with a discharge opening in its bottom attached to a central driving shaft and having a perforated peripheral wall to permit the escape of the liquid content of the sugar, or other wet material, being treated, while retaining the crystals or grains free from the liquid ingredient.

In machines of this type it has heretofore been the practice to discharge the solid matter through the discharge opening in the bottom of the basket by means of a discharging plow or scraper movably mounted in a stationary bearing or supporting bracket secured outside of the basket, usually to the surrounding curb or casing of the centrifugal. Since the plow was mounted outside of the basket and did not rotate therewith, frequent accidents have been caused by thrusting the plow against the walled up mass of sugar inside the basket while the basket was rotating too rapidly to render such discharging operation safe, and consequently oftentimes the plow and the basket were wrecked and injuries caused to the operator.

The present invention provides a means for unloading or discharging the basket, which is not subject to this danger because normally the plow or discharging device, which penetrates and disrupts or breaks down the walled up solid inside the basket, is normally rotating with the centrifugal itself and performs its plowing or scraping action by reason of its frictional retardation of its support, by which it is given a relatively slower speed of revolution than is the basket, so that there is no abrupt encounter between a rapidly rotating mass of sugar, which may be quite hard and firm, and a stationary plow.

A further feature of the invention consists in the association with a plow of this character of a bottom-closing valve, which normally, while the basket is being loaded, is in position to close the discharge opening in the bottom of the basket, while means are provided for lifting the valve from its seat to uncover the discharge opening before the plow is put into action by the plow retarding mechanism. These and other features of the invention will be particularly described in the following specification and will be defined in the claims hereto annexed.

To insure ease and certainty of operation both the valve-lifting and the plow-retarding mechanism is power actuated, which not only relieves the operator of heavy labor but makes it possible to apply suitable automatic control means to effect raising and lowering of the valve and actuation of the plow at suitable predetermined intervals. This means for exerting an automatic control over the operations of the valve and of the discharger plow forms no part of the invention herein claimed, as it will be the subject matter of a separate application.

In the accompanying drawings I have illustrated a simple and convenient construction and arrangement embodying the principles of this invention, in which Fig. 1 is an elevation, principally in central vertical section, of the pertinent part of a centrifugal apparatus equipped with my invention.

Fig. 2 is a top plan view on the plane X—X of Fig. 1.

Fig. 3 is a top plan view of the centrifugal basket and the discharger on plane Y—Y of Fig. 1.

Fig. 4 is a vertical sectional detail showing the lost motion connection between the closure valve and the discharger plow.

Figure 1:
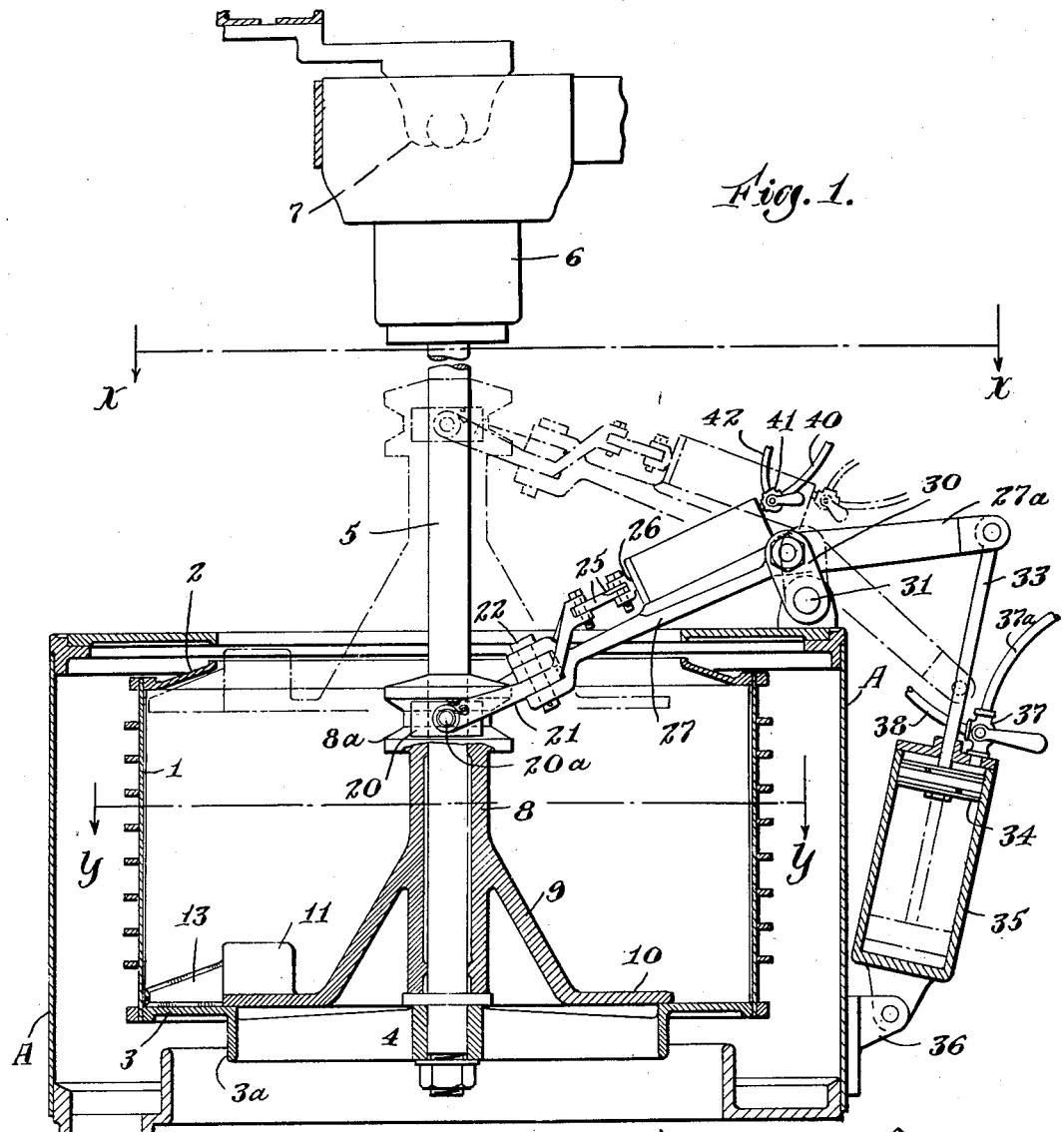
Figure 5:
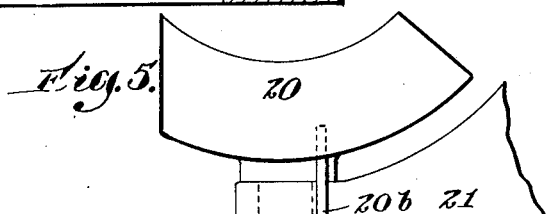
Fig. 5 is a detail view showing in plan one of the frictional clutch shoes and its associated supporting arm.
Figure 6:
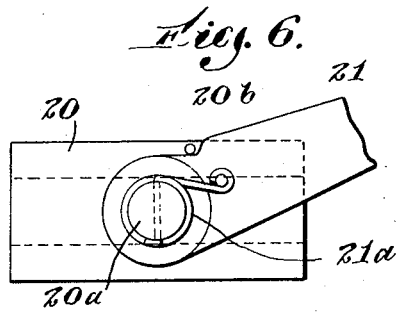
Fig. 6 is a side elevation of the construction shown in Fig. 5.

In the drawings illustrating this invention I have shown the usual type of sugar centrifugal basket 1 having, in this case, a flat bottom 3, whose interior flange 3ª is rigidly secured to the radiating spider 4 that secures it to the bottom of the central driving and basket supporting shaft 5, which in this case is suspended by means of a rotatable bearing head 6 to gyrate in a fixed hanger 7 in accordance with well known practice.

On that part of the shaft inside of the basket is mounted a tubular sleeve 8 that is free to slide up and down on the basket shaft. From this sleeve a conical member 9 projects outwardly and downwardly terminating in a horizontal flange, or plate, 10 of circular shape dimensioned to close the underneath discharge opening in which the basket supporting spider is located.

Any desired number of discharger plows may be employed, but I prefer to use two diametrically opposed plows, as illustrated in the present drawings. To this end the peripheral portion or plate 10 of the closure valve is provided with hollow upraised bosses 11, in the top of each of which is fixed a downwardly projecting pin 12 having an enlarged head 12ª at its lower end. This pin in effect forms a headed bolt which serves as a fulcral support for the pivoted discharger plow 13, whose inner or hub portion is recessed to receive the head 12ª of the connecting bolt so as to leave a substantial annular clearance space between the head 12ª and the top of the bored hub portion of the plow 13, so that when the plow-supporting plate or closure valve 10 lifts it may be open some distance before lifting the discharger plow with it. The continued upward movement of the plow-supporting member, after the head of the bolt 12 is engaged with the top portion of the plow hub, carries the plow with it so that the whole interior of the cylindrical wall of the basket is cleared by the action of the plow by the time the plow has reached its topmost position beneath the top ring 2 of the basket.

The means by which the plow is energized comprises a pair of clutch-like brake shoes, or blocks, 20, which are formed to engage an annular groove formed in a spool-like upward extension 8ª of the sleeve 8. Obviously, when these clutch blocks are forced into frictional engagement with the spool, since the spool is fast to or integral with the sleeve 8, the rotation of the sleeve is retarded with respect to the basket and consequently, as the basket continues to rotate at normal speed, the plow scoops out the subtending portion of the walled up material on the inside of the basket and deflects it toward the central opening. As the plow is raised by its shaft-embracing sliding support it continues to scoop out higher levels of the walled up material until it reached the top of the basket, at which time the discharging operation is completed. The lost motion between the plow and its supporting and transverse member 10 permits the discharge of the material through the bottom, while the plow is at its lowermost position adjacent to the bottom ring 3 of the basket.

Not only did the clutch blocks act to brake or retard the revolution of the plow relative to the revolution of the basket to render the plow operative, but they are also used as a means for raising the plow from bottom to top of the basket. Each clutch block 20 is provided with a horizontal cylindrical stud extension 20ª, which is mounted in a horizontal bearing in one of a pair of lever arms 21, which are fulcrumed upon a stud or pin 22 carried by a lever 27 provided with an outer power arm extension 27ª, which lever is fulcrumed in the upper ends of a pair of links 30 which are themselves pivoted or fulcrumed at their lower ends on a pivot pin 21 secured to, or carried by, a bracket mounted on top of the curb or casing A.

The clutch-supporting levers 21, fulcrumed on the stud 22 at the inner end of the lever 27, have their free or outer ends pivotally connected with a pair of toggle links 25, whose outer ends are pivotally connected with a piston rod 26 to whose outer end is secured a close fitting piston 26ª which receives the thrust of a helical spring 28, which normally tends to force the piston outward, thereby withdrawing the clutch blocks 20 entirely clear of the spool 8ª. On the other hand, through a compressed air pipe 40 controlled by a valve 41 compressed air is admitted against the outer face of the piston to expand the toggle links and throw the clutch blocks 20 into frictional engagement with the spool with any desired degree of force. It will therefore be seen that the piston acting under the pressure of compressed air is operatively engaged with the spool and is disengaged therefrom by the return spring 28 to raise and lower the spool which forms the connecting means between the plow-supporting structure and the closure valve and the actuating lever 27. Another compressed air cylinder 35 is pivotally mounted at its lower end to a fixed bracket 36 and carries a piston 34 connected by piston rod 33 with the power arm 27ª of the lever 27. Compressed air is introduced through the valve controlled coupling 37 at the top of the piston by means of compressed air supply pipe 37ª. A vent or exhaust pipe 38 allows the air to escape from the top of the cylinder when the piston is raised.

Ordinarily the weight of the plow-supporting structure and valve is sufficient to allow this structure to slide down to the bottom position from which it is lifted by air pressure against the top of the piston 34 after the clutch blocks 20 have been engaged by the action of the piston 26ª.

To insure proper engagement between the pivotal clutch blocks 20 and the groove in the spool 8ª, when the clutch blocks are disengaged and removed from the spool, I provide for each clutch block a stop pin 20ᵇ which limits the rotation of the clutch block on its axis by engagement with the supporting arm 21, while a torsion spring 21ª, secured at one end to the arm 21 and at the other end to the axial stud 20ª of the clutch block, serves to yieldingly move the clutch block into engagement with the stop pin, thus holding it in position to register with the annular groove in the spool 8ª.

The operation of the device is as follows. Assuming the parts to be in the position shown in Fig. 1, the basket is rotated at filling speed and the sugar, or other material, is admitted into the basket through the usual chute (not shown) until the material has walled up inside of the basket to the desired thickness of wall. The centrifugal then operating at normal purging speed causes the liquid to be thrown out radially through the foraminous cylindrical wall of the basket. When the sugar has been purged and washed by the application of the usual spray and dried to the desired degree of dryness by the centrifugal extraction of the wash liquor, the centrifugal brake is applied to slow down or partly stop the machine, at which point the sugar is ready for discharge.

In the discharging operation, in the case of a flat bottom basket, whose opening is normally closed by a closure valve, the valve is lifted before the plow begins its discharging or unloading action. The first step, then, is to admit compressed air into the cylinder 35 to depress the piston and raise the valve from its seat. After the valve has begun to lift, the clutch or brake block actuating piston 26ª is energized by the admission of compressed air to exert a frictional pressure against the terminal spool portion of the sleeve, thus retarding the revolution of the unloading mechanism or plow and deflecting the cut away sugar into the discharge opening. The continued depression of the piston 34, under the compressed air admitted, causes the plow to traverse vertically the inside wall of the basket, thus shearing away and deflecting additional portions of the sugar wall until it reaches the top, while at the same time piston head 26ª is maintaining a braking pressure against the plow support to enable the plow to shear away the sugar by reason of its slower rotation in relation to the basket.

When the whole wall of sugar has been discharged the compressed air in the cylinder 29 is exhausted or vented by means of the exhaust pipe 42, thus allowing the return spring 28 to force the piston outward and disengage the clutch blocks 20 from its frictional spool, thereby allowing the sleeve 8 and its supported valve and plow to drop to the bottom of the basket preparatory to receiving its next load of material for treatment. After the centrifugal treatment of the material has been finished, the lever 27 is lowered until the clutch blocks are in registry with the grooved brake spool 8ª, after which they are moved into engagement therewith and the cycle of operations is again repeated.

It will be understood that the control of the admission of compressed air into the two cylinders, as well as the venting or exhausting of the compressed air therefrom, is effected by means of three-way control valves 37 and 41, respectively. In the present case these valve fixtures are shown mounted directly on the cylinder for manual operation, but obviously either, or both, of them could be located at a distance to control the admission and the exhaust of compressed air, when such distant location is more convenient for automatic control.

It will be noted that the sleeve or carrier, which supports the closure valve and the discharging or disrupting plow, is freely slidable on the shaft and that the vertical movement or traverse of the sleeve is entirely independent of the rotary movement relative to the basket revolution induced by application of the brake shoes, so that these two distinct movements may be effected either at different times or simultaneously. In the flat bottom type of basket, shown in the drawings, where it is customary to use a bottom closure valve, the valve is permitted to lift before the retarding brake is actuated to produce the lag of the revolving plow behind the rotative speed of the basket, but in a self-discharging type of basket that is a basket with a steeply inclined bottom ring where frequently no bottom valve is used under the above described arrangement the plow may be put in operation whether the plate 10 covers the entire circumference of the bottom opening outside of the connecting cone 9 or not since the plows perform their function in the same manner and by means of the same mechanism whether the plow supporting member forms a bottom closure or not. Furthermore since the retarding brake shoes are applied equally against opposite sides of the sleeve, the application of the retarding brake is free from any tendency to displace or thrust aside the centrifugal from its normal axis of rotation.

Since the discharger may be put into action without waiting for the centrifugal to slow down to a low speed which is necessary where the plow is carried by a fixed support the digging of the plow into the sugar wall has a very substantial braking or retarding action on the revolving centrifugal so that the work of discharging may be effected by the momentum of the centrifugal after the power is cut off, thereby not only relieving the centrifugal brake of considerable stress and wear, but also dispensing with any need of application of power when the machine has slowed down to keep the machine running at low speed, while using the discharger plow. It may even be possible in some cases to operate the centrifugal continuously although at a reduced rate of speed when discharging. Any desired form of plow may be used for shearing away the walled up material according to the nature and hardness of the material when packed in the basket under centrifugal force.

What I claim is:

1. The combination with a gyratory centrifugal comprising, a basket provided with a central discharge opening in its bottom and a driving and supporting shaft to which it is secured, a sleeve freely slidable on said shaft and rotatable in relation thereto, a discharger plow and a bottom closure valve, both supported by said sleeve and partaking of its sliding and its rotative movements, means for imparting sliding movement to said sleeve, and independently actuated means for frictionally gripping said sleeve to retard its rotation in relation to the basket whereby the discharge opening is uncovered and the walled up material is disrupted and discharged through the bottom.

2. The combination with a gyratory centrifugal, embracing a basket provided with a central discharge opening in its bottom and a central driving and supporting shaft to which the basket is secured, a slidable member loosely mounted on said shaft to permit vertical sliding movement thereon and also to permit differential rotation in relation thereto, a bottom closure valve connected with said slidable member, a discharger plow also supported by said slidable member to permit vertical movement of the valve in advance of vertical movement of the plow, and actuating means by which said slidable member may be independently lifted and retarded to uncover the bottom discharge opening and discharge the material therethrough.

3. In a gyratory centrifugal embracing, a centrifugal basket provided with a central bottom discharge opening and a central driving and supporting shaft to which said basket is secured, the combination of a sleeve loosely mounted on said shaft to permit vertical sliding movement and also relative rotative movement in relation to said shaft, a closure valve secured to said sleeve, a discharger plow loosely supported by said sleeve to permit a relative vertical movement between the valve and the plow, non-revoluble means for frictionally gripping said sleeve to retard the same, and means for raising and lowering said gripping means to effect the vertical movement of the valve and the plow for the purpose of discharging the load through the bottom of the basket.

4. In a centrifugal of the class described, the combination with a central basket supporting and driving shaft, of a sleeve loosely mounted thereon to permit sliding and rotative movements in relation to said shaft, one or more discharger plows supported by said sleeve, a brake spool at the upper end of said sleeve, externally supported brake shoes adapted to be moved inwardly into engagement with said spool, means for gripping said brake shoes against the spool on opposite sides thereof, and independently controlled means for lifting said brake shoes in order to lift the sleeve and move the sleeve supported plow from the bottom to the top of the basket and thereby discharge the material through the bottom of the basket.

5. In a centrifugal of the class described, the combination of a sleeve loosely mounted on the basket supporting and driving shaft to permit sliding and rotative movements of the sleeve in relation thereto, a disrupting member supported by said sleeve in position to disrupt the walled up material inside the basket periphery to discharge it through the bottom, a vertically movable lifting arm, movable brake shoes and their actuating mechanism carried by said arm to engage a grooved annular portion of the sleeve and frictionally grip the same, means for raising said arm and thereby effecting the lifting of the sleeve and the plow to effect the breaking down of the walled up material and its discharge through the bottom of the basket.

6. The combination with the centrifugal basket supporting and driving shaft, a sleeve loosely mounted thereon to permit independent vertical and rotative movements in relation thereto, a discharging plow supported by said sleeve, an oscillating lever fulcrumed on a support outside of the basket, a compressed air actuated piston, frictional gripping shoes actuated by said piston to engage an annular portion of the sleeve to effect retardation of the revolution of the sleeve while the basket is rotating, a second compressed air actuated piston for oscillating said lever to raise the sleeve and its plow for the purpose of discharging the material through the bottom of the basket.

7. In a gyratory centrifugal embracing a basket provided with a discharge opening in its bottom and secured to a central driving and supporting shaft, the combination of a closure valve loosely mounted on said shaft to permit independent vertical and rotative movements in relation thereto, means connected with said valve for disrupting the walled up material inside the basket, a lifting arm mounted outside of the basket on a fixed support, pivotally mounted brake shoes carried by said lifting arm in position to engage the exterior of said sleeve to lift the same when the arm is raised, an air actuated piston for setting said brake shoes into gripping engagement with the sleeve to retard the rotation of the sleeve, a valve for controlling the admission of air against the piston to actuate the same, and means for raising and lowering said arm to raise the sleeve and bring the brake shoes in position to be operatively engaged with the sleeve at the lowermost position of the sleeve.

8. A discharging apparatus for a sugar centrifugal embracing, a sleeve loosely mounted on the centrifugal supporting and driving shaft to permit vertical and rotative movemnts in relation to the shaft, a discharger plow connected with said sleeve to engage and disrupt the walled up sugar inside the basket, actuating means for said sleeve embracing a vertically movable arm mounted on a fixed support, sleeve-engaging brake shoes carried by said arm, means for actuating said brake shoes comprising a compressed air piston and cylinder with its controlling valve, means for raising and lowering said arm comprising a compressed air cylinder and piston with its controlling valve.

9. Means for discharging solid material through the bottom of a sugar centrifugal embracing in combination, a discharging plow, a support therefor loosely mounted on the driving and supporting shaft of the centrifugal to permit vertical sliding and rotative movements of the support with its plow in relation to said shaft, power actuated means for imparting vertical movement to said plow and its support, and independently actuated means for frictionally retarding said plow supporting means in relation to the revolving centrifugal.

10. Means for discharging solid material through the bottom of a sugar centrifugal embracing in combination, a discharging plow, a support therefor loosely mounted on the centrifugal shaft to permit free sliding vertical movement and also rotative movement in relation to the centrifugal, independently actuated means for frictionally engaging and retarding said plow supporting means and for imparting vertical sliding movement thereto, respectively, whereby the plow is actuated to disrupt the walled up sugar inside the basket throughout the vertical height of said wall.

11. Means for discharging the solid material through the bottom of a gyratory centrifugal embracing, a discharging plow, a supporting sleeve for said plow loosely mounted on the driving and supporting shaft of the centrifugal and normally revolving therewith during the centrifuging operation, a frictional brake comprising opposed brake-shoes carried by a non-revoluble support in position to move inwardly and engage and frictionally grip said plow supporting sleeve and thereby retard its rotation in relation to said shaft to permit the plow to cut away the material from the inside of the centrifugal basket, and means for forcing said brake shoes into gripping engagement with said sleeve.

12. Means for discharging the solid material through the bottom of a gyratory centrifugal embracing, a discharging plow, a supporting sleeve for said plow loosely mounted on the driving and supporting shaft of the centrifugal and normally revolving therewith during the centrifuging operation, oppositely movable frictional brake-shoes carried by a non-revoluble pivotal support in position to engage and frictionally grip said plow supporting sleeve and thereby retard its rotation in relation to said shaft to permit the plow to cut away the material from the inside of the centrifugal basket, and means comprising a power actuated piston for forcing said brake into gripping engagement with said sleeve thereby retarding the rotation of the plow and causing it to cut away the walled up material inside the basket.

13. Means for discharging solid material through the bottom of a centrifugal embracing in combination, a discharging plow mounted in the centrifugal basket to revolve therewith during the normal operation of the centrifugal, and power actuated means arranged to frictionally engage and retard the plow support and thereby retard the revolution of the plow in relation to the centrifugal and the material walled up therein while the centrifugal is revolving, and independently operable means for causing the plow to traverse the basket vertically and thereby disrupt the walled up material therein.

EUGENE ROBERTS.